United States Patent [19]

Bertolacini

[11] 4,018,711

[45] Apr. 19, 1977

[54] CATALYTIC COMPOSITION

[75] Inventor: Ralph J. Bertolacini, Chesterton, Ind.

[73] Assignee: Standard Oil Company (Indiana), Chicago, Ill.

[22] Filed: Nov. 9, 1973

[21] Appl. No.: 414,435

Related U.S. Application Data

[60] Continuation-in-part of Ser. No. 167,429, July 29, 1971, abandoned, which is a division of Ser. No. 873,305, Nov. 3, 1969, Pat. No. 3,679,575.

[52] U.S. Cl. .............................. 252/455 Z; 208/138
[51] Int. Cl.² ......................................... B01J 29/06
[58] Field of Search .................. 252/455 Z; 208/65

[56] References Cited

UNITED STATES PATENTS

| | | |
|---|---|---|
| 3,480,539 | 11/1969 | Voorhies et al. ................. 208/111 |
| 3,546,102 | 12/1970 | Bertolacini .................... 252/455 Z |
| 3,574,092 | 4/1971 | Mitsche ......................... 252/455 Z |
| 3,679,575 | 7/1972 | Bertolacini .......................... 208/65 |

*Primary Examiner*—Carl F. Dees
*Attorney, Agent, or Firm*—James L. Wilson; Arthur G. Gilkes; William T. McClain

[57] ABSTRACT

The catalyst comprises a Group VIII noble metal, mordenite having a silica-to-alumina ratio of at least 19:1, and an adsorbent refractory inorganic oxide. The preferred Group VIII noble metal is platinum; the preferred refractory inorganic oxide is a catalytically active alumina. The mordenite has a silica-to-alumina ratio of less than 45:1.

The processes in which the catalyst is employed are processes for the reforming of petroleum hydrocarbon feedstocks.

9 Claims, 2 Drawing Figures

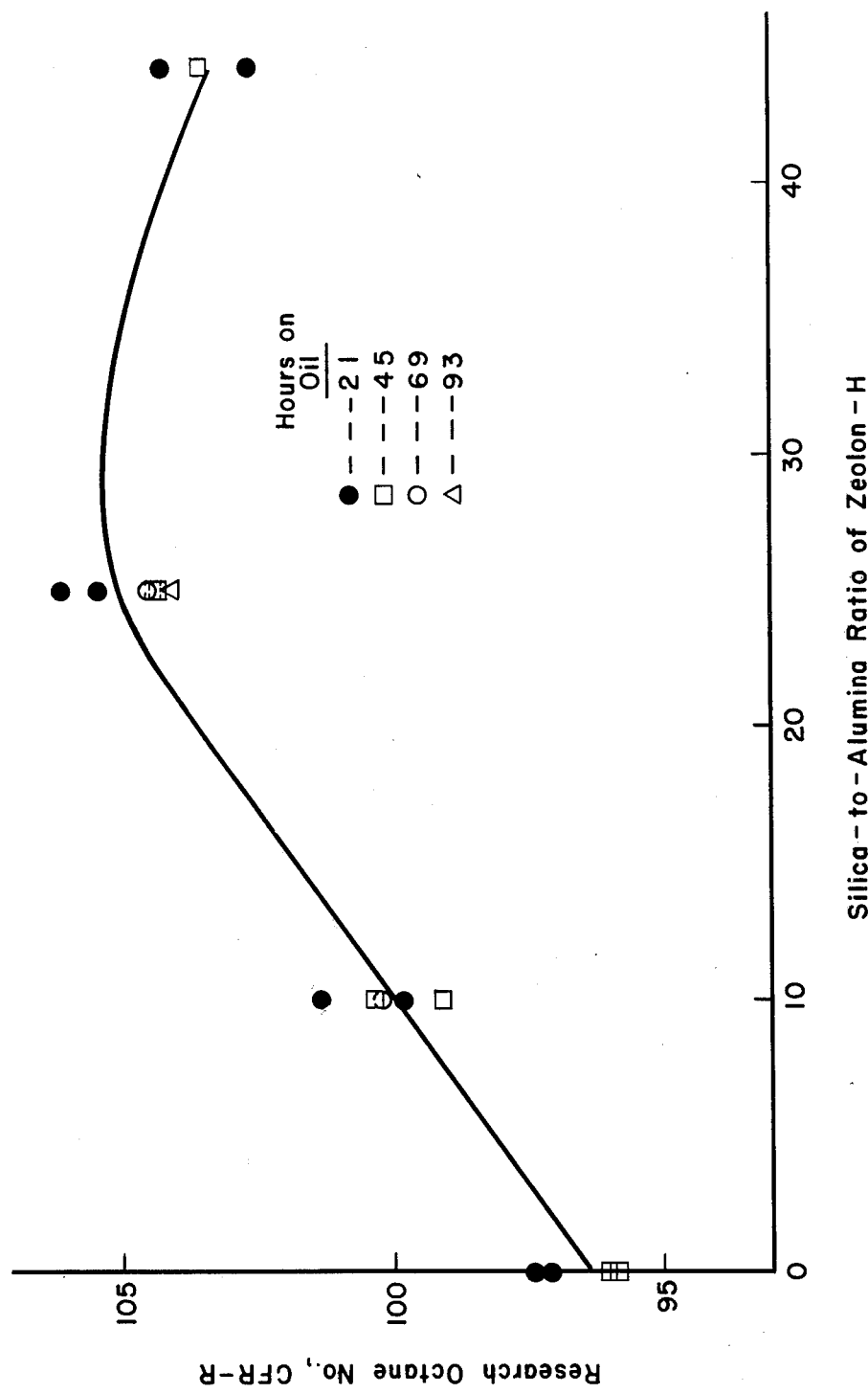

CATALYTIC COMPOSITION

CROSS-REFERENCES TO RELATED APPLICATIONS

This application is a continuation-in-part application of co-pending Application Ser. No. 167,429, filed on July 29, 1971 and now abandoned. Ser. No. 167,429 is, in turn, a division application of Application Ser. No. 873,305, filed on Nov. 3, 1969, and now U.S. Pat. No. 3,679,575.

BACKGROUND OF THE INVENTION

The present invention is related to a catalytic composition and to hydrocarbon conversion processes employing that catalytic composition. More particularly, it is related to an improved catalytic composition for the reforming of petroleum hydrocarbon feedstocks and to reforming processes utilizing such catalytic composition.

Group-VII-metal-containing catalysts have been employed on a commerical scale in a wide range of reactions, most of them involving hydrogenation, dehydrogenation, oxidation, isomerization, and dehydrocyclization. Especially successful has been the use of alumina-supported platinum catalysts in the conversion of low-octane petroleum naphthas under hydroforming conditions into gasolines of high anti-knock rating. In a typical platinum-hydroforming process, a mixture of charging stock and hydrogen-containing gas is passed through a bed of platinum-alumina-halogen catalyst containing between about 0.05 to 2% by weight of platinum. The hydroforming reactions are carried out at a temperature in the range of about 800° F. to 1,000° F., a total pressure between about 50 pounds per square inch gauge (psig) and 1,200 psig, a recycle gas rate within the range of about 2,000 standard cubic feet per barrel of charging stock (SCFB) to about 10,000 SCFB, and a weight hourly space velocity (WHSV) between about 0.5 and 10 weight units of hydrocarbon per hour per weight unit of catalyst. Hydrogen makes up more than 50 volume percent of the hydrogen-containing recycle gas used therein.

The reforming or hydroforming of various hydrocarbon fractions simultaneously effects a group of reactions, including the production of 6-membered ring naphthenes from other naphthenes by isomerization, dehydrogenation of naphthenes to form aromatics, cyclization of paraffins to form aromatics, isomerization of straight-chain paraffins to form branched-chain paraffins, cracking of paraffins to carbon and to unsaturated fragments of lower molecular weight, hydrogenation of carbon and of the unsaturated fragments, and various side reactions. All of these reactions tend to produce products containing motor-fuel fractions of improved anti-knock rating.

The activity and selectivity of hydrocarbon conversion catalysts depend upon a variety of factors, such as the identity and condition of the catalyst components, the mode of catalyst preparation, the presence or absence of promoters and modifiers, the presence or absence of contaminating materials in the charging stock and the proportion thereof, the conversion temperature, the hydrogen partial pressure in the conversion zone, and the like. Suitable catalysts are conveniently prepared by commingling a Group VII metal compound with a hydrous adsorbent refractory inorganic oxide, such as alumina, and thereafter drying and calcining. A new catalyst composition has now been discovered which affords a hydrocarbon conversion catalyst of greatly improved catalytic properties.

SUMMARY OF THE INVENTION

Accordingly, there is provided an improved catalytic composition for the reforming of petroleum hydrocarbon streams. This catalytic composition comprises a Group VIII noble metal, mordenite, and an adsorbent refractory inorganic oxide, said mordenite having a silica-to-alumina ratio of at least 19:1. The preferred Group VIII noble metal is platinum. The preferred refractory inorganic oxide is a catalytically active alumina selected from the group consisting of gamma-alumina, eta-alumina, and mixtures thereof. The maximum silica-to-alumina ratio of the mordenite should be less than 45:1.

In another aspect, there are provided also improved reforming processes. One of the processes comprises contacting a platinum hydrocarbon feedstock in the presence of hydrogen and under reforming conditions with the improved catalytic composition of the present invention. Another reforming process comprises contacting a petroleum hydrocarbon feedstock in the presence of hydrogen and under reforming conditions with a first catalyst to produce an intermediate reformate and subsequently contacting the intermediate reformate with a second catalyst in the presence of hydrogen and under reforming conditions. In this latter process, the first catalyst is a platinum-alumina-halide catalyst and the second catalyst is the improved catalytic composition of the present invention.

BRIEF DESCRIPTION OF THE DRAWINGS

Reference to the accompanying drawings may facilitate understanding of the present invention.

FIG. 2 presents the results of tests described hereinbelow demonstrating the effect of the silica-to-alumina ratio of the mordenite in a catalyst upon the unleaded research octane number obtained when reforming with the catalyst.

DESCRIPTION AND PREFERRED EMBODIMENTS

Figure 1:
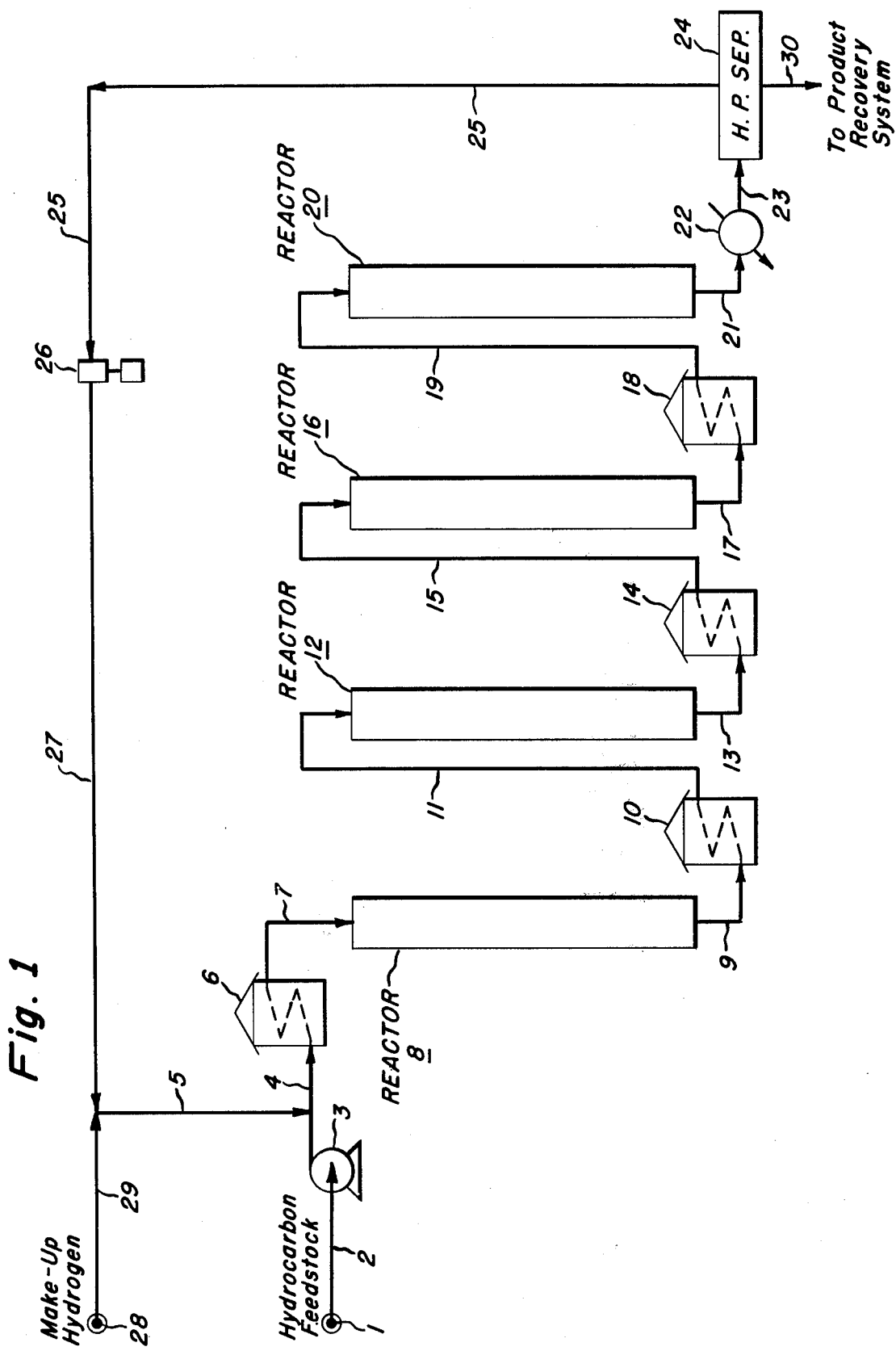
FIG. 1 is a simplified process flow diagram of a specific embodiment of a process of the present invention.

According to the present invention, there is provided an improved catalytic composition for the reforming or hydroforming of petroleum hydrocarbon streams. There are also provided reforming processes employing this improved catalytic composition, which processes produce high-octane blending components and/or chemicals. The products from these processes are satisfactory charge stocks for an extraction unit to recover aromatics for use as chemicals or for gasoline blending purposes.

A conventional commercial reformer consists of a number of reactors, such number being in excess of three. In the case of a regenerative reforming unit, an additional reactor is employed as a swing reactor. An example of a conventional regenerative reforming process is Ultraforming, which is adequately described in U.S. Pat. No. 2,773,014, and in Petroleum Engineer, Vol. XXVI, No. 4, April, 1954, at page C-35.

The improved catalyst of the present invention is a catalytic composition comprising a Group VIII noble metal, mordenite, and an adsorbent refractory inorganic oxide, said mordenite having a silica-to-alumina ratio of at least 19:1. This catalyst can be distinguished from the catalyst that is disclosed in U.S. Pat. No. 3,574,092. The catalyst of this patent comprises a platinum group metallic component, a technetium component, and a carrier material containing alumina and about 0.5 to about 20 weight percent mordenite, while the catalyst of the present invention is a technetium-free catalyst.

One embodiment of the catalyst of the present invention is a technetium-free catalyst which comprises a Group VIII noble metal, mordenite, and an adsorbent refractory inorganic oxide, said mordenite having a silica-to-alumina ratio that is at least 19:1. In addition to these components, another embodiment also comprises a combined halogen, such as combined chlorine. A third embodiment of the improved catalyst of the present invention is a catalyst which consists essentially of a Group VIII noble metal, mordenite having a silica-to-alumina ratio that is at least 19:1, and an adsorbent refractory inorganic oxide. In still another embodiment, the catalyst consists essentially of a Group VIII noble metal, mordenite having a silica-to-alumina ratio of at least 19:1, combined halogen, and an adsorbent refractory inorganic oxide.

For each of the above embodiments, the preferred Group VIII noble metal is platinum. The Group VIII noble metal may be present in an amount within the range of about 0.01 to about 10 weight percent, preferably, within the range of about 0.1 to about 3.0 weight percent. Moreover, the mordenite may be present in an amount within the range of about 0.5 to about 75 weight percent, preferably, within the range of about 1.0 to about 50 weight percent; and the adsorbent refractory inorganic oxide may be present in an amount within the range of about 15 to about 99.5 weight percent. If present, the halogen may be present in an amount within the range of about 0.1 to about 2.0 weight percent. Such quantities of combined halogen may promote the reforming reactions without causing undesirable physical or chemical effects on the catalyst or process.

In addition, the catalyst may contain a second co-catalytic metal, such as rhenium and tungsten, which may be incorporated by cogelling or impregnation. Rhenium may be present in an amount from about 0.1 to about 1.0 weight percent; tungsten, in an amount from about 0.5 to about 5.0 weight percent.

A group VIII noble metal is employed as the hydrogenation-dehydrogenation component of the improved catalytic composition of the present invention. The Group VIII noble metals include the metals of the "Platinum Series" and the metals of the "Palladium Series", i.e., platinum, iridium, osmium, palladium, rhodium, and ruthenium. The preferred Group VIII noble metal is platinum.

The aluminosilicate material that is employed in the catalytic composition of this invention is a particular form of aluminosilicate material known as mordenite. While mordenite is naturally occurring, a synthetic mordenite known as Zeolon has become available commercially from the Norton Company. Mordenite is characterized by its high silica-to-alumina ratio of about 10:1 or greater, and its crystal structure. Composition of mordenite, as given in Kirk-Othmer, "Encyclopedia of Chemical Technology", Vol. 12, page 297, is $(Ca, Na_2)Al_2Si_9O_{22} \cdot 6H_2O$. The proposed structure is one in which the basic building block is a tetrahedron consisting of one silicon or aluminum atom surrounded by four oxygen atoms. The crystal is made up of chain of 4- and 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings, but they have interconnected cages, whereas the mordenite has parallel chains of uniform diameter. For example, synthetic faujasite, which has the formula $Na_3Al_3Si_4O_{14}$, is characterized by a 3-dimensional array of pores which consist of 12–13 A cages interconnected through 8–9 A windows.

The mordenite employed in the catalyst of the present invention has a silica-to-alumina ratio of at least 19:1. As shown hereinafter, its silica-to-alumina ratio should be less than 45:1.

The mordenite in the catalyst of the present invention may be in the unexchanged cation form containing exchangeable sodium and/or calcium ions, or other alkali metals or alkaline earth metals; or, preferably, the alkali metal cations may be replaced with hydrogen ions, such as by exchanging the alkali metal ions with ammonium ions and then heating the exchanged material to drive off ammonia, leaving the mordenite in the hydrogen form. Mordenite differs from other zeolites in that substantially all the exchangeable metal cations may be replaced with hydrogen ions without causing destruction of the characteristic crystal structure.

The catalyst that is employed in the process of this invention may be prepared by forming an adsorbent refractory co-catalytic support material comprising mordenite and an adsorbent refractory inorganic oxide and incorporating with said support material a Group VIII metal or compound thereof in an amount of about 0.01 to about 10 weight percent, based upon the weight of the catalytic composition. The finished catalyst will contain mordenite in an amount within the range of about 0.5 weight percent to about 75 weight percent and the adsorbent refractory inorganic oxide in amount within the range of about 25 weight percent to about 99.5 weight percent, based upon the weight of the catalyst.

A preferred adsorbent refractory inorganic oxide for use in the catalyst of the present invention is alumina. Other adsorbent refractory inorganic oxides which may be used include, for example, silica gel, silica-alumina, magnesia-alumina, zirconia-alumina, and the like.

The adsorbent refractory inorganic oxide base or support material advantageously comprises either gamma-alumina or eta-alumina, or mixtures of these allotropic forms. These definitions of alumina are definitions adopted as standard nomenclature by Russell in his brochure entitled "Alumina Properties", Technical Paper No. 1C, 1953, Aluminum Company of America, and by Stumpf et al., IND. ENG. CHEM., 42, 1950, pages 1398–1403.

The catalyst composition of the present invention may be formulated in various ways. For example, finely divided mordenite zeolite may be stirred into an alumina sol, a soluble non-halogen Group VIII noble metal compound, such as, for example, $(NH_3)_2Pt(NO_2)_2$, added to the sol; the sol-mordenite mixture cogelled by addition of dilute ammonia, and the resulting solid dried and calcined. Another way of preparing the catalyst composition is by mixing finely divided mordenite zeolite into an alumina sol as above, gelling the sol by addition of dilute ammonia to produce a gel which is then dried and pelleted. The pellets are then calcined, cooled, and then impregnated with a Group VIII noble metal solution. A third method, which is also suitable for making the catalyst composition of this invention, comprises blending an alumina hydrogel and finely divided mordenite zeolite, adding to this blend a solution of the Group VIII noble metal, and thoroughly blending the mixture. The resulting gel mixture is then dried and pelleted, and the pellets are calcined. Suitable drying conditions for use in the various catalyst manufacturing methods include a temperature in the range of about 200° to 400° F. for a time in the range of about 5 to 30 hours. Suitable calcination conditions include a temperature in the range of about 900° to 1,500° F. for a time of about 2 to 20 hours. Preferred drying and calcining conditions are a temperature of about 250° F. for about 16 hours and a temperature of about 1,000° F. for about 6 hours, respectively.

The operating conditions that are employed in the process of the present invention are: an inlet temperature within the range of about 700° F. to about 1,000° F., preferably, within the range of 850° F. to about 1,050° F.; a pressure ranging from atmospheric to about 1,000 psig, preferably, from about 50 psig to 500 psig; a WHSV of at least 0.5 weight unit of hydrocarbon per hour per weight unit of catalyst, preferably, of at least 1 weight unit of hydrocarbon per hour per weight unit of catalyst; and a recycle gas rate within the range of about 1,000 SCFB to about 20,000 SCFB, preferably, from about 3,000 SCFB to about 10,000 SCFB. Typical petroleum hydrocarbon feedstocks that may be reformed by means of the present invention include virgin naphthas, cracked naphthas, catalytic gasolines, and coker naphthas, or mixtures thereof boiling within the range of about 120° F. to about 500° F., and preferably within the range of about 180° F. to about 400° F. When the improved catalytic composition of the present invention is the sole catalyst being employed in the reforming process, the feedstock may contain nitrogen, sulfur, and olefinic compounds. Therefore, a feedstock need not be pretreated prior to being reformed in some embodiments of the processes of the present invention.

The processes of the present invention are carried out in conventional types of equipment known to the art. One may, for example, employ catalysts in the form of pills, pellets, granules, extrudates, broken fragments, or various substantial shapes, disposed as a fixed bed within a reactor, and the feedstock being reformed may be passed through the reactor in the liquid, vapor, or mixed phase, and in either upward or downward flow. Alternatively, the catalyst may be in a suitable form for use in moving beds, in which the feedstock and the catalyst are preferably passed in counter current flow; or in fluidized-solid processes in which the feedstock is passed upward through a turbulent bed of finely divided catalyst; or in a suspensoid process, in which the catalyst is slurried in the feedstock and the resulting mixture is conveyed into the reaction zone.

In the case of a fixed bed process, the catalyst may be present in a series of beds in a multi-reactor system. Each reactor may contain one or more catalyst beds. In the case of multiple catalyst beds in a reactor, reheat may be supplied between catalyst beds by means known to those skilled in the art; for example, by the introduction of heated inert gas streams or heated hydrogen-containing gas streams into the reactor between catalyst beds. Reheat furnaces may be employed between reactors. These and other variations known to those skilled in the art are within the scope of the present invention and are not intended to limit the present invention.

A specific embodiment of a process of the present invention is presented in the accompanying FIG. 1. FIG. 1 is a simplified process flow diagram of the process and does not show auxiliary equipment, such as pumps, heat exhangers, valves, and the like. The use and location of such items are known to those skilled in the art.

Referring to FIG. 1, a full-boiling Mid Continent naphtha from source 1 passes through line 2 into pump 3 to be pumped into line 4, where it is combined with hydrogen-containing gas from line 5 to form a hydrogen-hydrocarbon stream. The hydrogen-hydrocarbon stream passes through line 4 into preheat furnace 6 where it is heated to a temperature within the range of about 850° F. to about 960° F. The heated hydrogen-hydrocarbon stream passes through line 7 into the top of reactor 8, which is the first of four reactors in series.

In the case of the first three of the reactors in series, reactors 8, 12, and 16, each contains one catalyst bed of a platinum-alumina-chloride catalyst. This catalyst contains 0.7 weight percent platinum and about 0.7 weight percent combined chlorine on a gamma-alumina support. The fourth reactor, reactor 20, contains one bed of an embodiment of the improved reforming catalyst of the present invention. This latter catalyst contains 0.7 weight percent platinum, about 0.7 weight percent chloride, and 2.0 weight percent mordenite that has a silica-to-alumina ratio of 27:1; the remainder of the catalyst is gamma-alumina.

In this process is a fifth reactor that is not shown in the drawing. This reactor is employed as a "swing" reactor and may be substituted for any of the reactors in series, that is, it is interchangeable with any of the four. When the catalyst in any of the reactors 8, 12, 16, and 20 becomes deactivated and needs regeneration, that particular reactor is taken out of service and this fifth reactor is used in its place. The operations of such regenerative reforming system is well known to those skilled in the art and is adequately discussed in U.S. Pat. No. 2,773,014. The "swing" reactor in this specific embodiment of the present invention may contain either the platinum-alumina-chloride catalyst employed in reactors 8, 12, and 16 or the mordenite-containing catalyst employed in reactor 20. Preferably, it contains the mordenite-containing catalyst of the present invention.

The operating conditions for this reactor system are: an inlet temperature within the range of 850° F. to about 960° F., a pressure within the range of about 300 psig, and a recycle gas rate within the range of about 3,000 SCFB to about 8,000 SCFB. The WHSV employed with the platinum-alumina-chlorine catalyst is within the range of about 1 to about 5 weight units of hydrocarbon per hour per weight unit of catalyst, while the WHSV employed with the platinum-mordenite-alumina catalyst may be up to 3 times that used with the platinum-alumina-chloride catalyst. The WHSV employed with the platinum-mordenite-alumina catalyst may be varied by changing the amount of catalyst that is loaded in the last or "tail" reactor.

The hydrogen-hydrocarbon stream passing through reactor 8 is passed consecutively through line 9, reheat furnace 10, line 11, reactor 12, line 13, reheat furnace 14, line 15, reactor 16, line 17, reheat furnace 18, line 19, and reactor 20. The reformate coming from the tail reactor 20 is passed through line 21, cooler 22, and line 23 into high-pressure separator 24 where a hydrogen-containing gas is separated therefrom. The cooler 22 cools the reformate to a temperature of about 120° F. The hydrogen-containing gas passes through line 25 and is compressed by compressor 26. The compressed gas passes through lines 27 and 5 to be returned to the reactor system. Makeup hydrogen from source 28 may be added to the gas stream by means of line 29.

The liquid product from high-pressure separator passes through line 30 to a suitable product recovery system wherein the remaining light ends are removed from the product to form a stabilized product and the stabilized product is fractionated subsequently to usable fractions and gasoline blending components. Such product recovery systems are known to those skilled in the art and need not be described further here.

Another embodiment of a process of the present invention would employ a process flow scheme as described above and shown in the accompanying FIG. 1. However, in this embodiment each reactor would contain the improved catalyst of the present invention.

The following examples are presented for purposes of illustration only and are not intended to limit the scope of the present invention.

EXAMPLE I

A commercially prepared catalyst was selected as a typical platinum-alumina-chlorine reforming catalyst. This catalyst was employed for comparative purposes and will be identified hereinafter as Catalyst A. It was commercially prepared by the American Cyanamid Company and was sold as Aeroform PHF-5 catalyst. It contained 0.74 weight percent platinum and 0.88 weight percent chlorine. Its surface area was 186 $M_2$/gm. This particular catalyst did not contain any Zeolon-H.

EXAMPLE II

A typical platinum-alumina-chlorine reforming catalyst was prepared in the laboratory. This catalyst will be identified hereinafter as Catalyst B. PHF-type alumina (8.9 weight percent alumina), manufactured by the American Cyanamid Company, was dried overnight in air at a temperature of 250° F. and was calcined for 2 hours in air at a temperature of 900° F. For these drying and calcining procedures, as well as for subsequently described drying and calcining procedures employed in the preparation of the other catalysts, the air flow rate was maintained at a level of about 1.5 cubic feet of air per hour. The calcined alumina was blended with Sterotex to provide 4% Sterotex and then pelleted into ⅛ inch = ⅛ inch pellets. The pellets were calcined in air for 3 hours at a temperature of 1,000° F. and ground to pass through a 20-mesh sieve (U.S. Sieve Series) and be retained on a 40-mesh sieve (U.S. Sieve Series).

A 50-gm. portion of the calcined material was impregnated with a solution that had been prepared by dissolving 1.0 gm. of $H_2PtCl_6$ (40 weight percent platinum) and 2.0 gms. of $Al(NO_3)_3$ in 45 ml. of distilled water. The impregnated material was dried for 3 hours in air at a temperature of 250° F. and was calcined in air for 3 hours at a temperature of 1,000° F. This catalyst, Catalyst B, was prepared to contain 0.8 weight percent platinum and 0.8 weight percent chlorine. It did not contain any Zeolon-H.

EXAMPLE III

A catalyst containing Zeolon-H that possessed a silica-to-alumina ratio of 10:1 was prepared. This catalyst is identified hereinafter as Catalyst C. A 5.1-gm. portion of powdered Zeolon-H, containing 97.7 weight percent solids and obtained from the Norton Company as sample number BD-18-6W, was blended with 200 ml. of distilled water. This Zeolon-H water blend was added to 2,720 gms. of PHF-type alumina sol (8.9 weight percent alumina) prepared by the American Cyanamid Company. After thorough blending, 100 ml. of a 10% ammonium hydroxide solution were added to produce a gel. The gel was dried in air overnight at 250° F. and was subsequently calcined in air for 2 hours at a temperature of 900° F. Sufficient Sterotex was added to the calcined material to provide 4% Sterotex and the resulting mixture was pelleted into ⅛ inch X ⅛ inch pellets. The pellets were calcined in air for 3 hours at a temperature of 1,000° F. and were ground subsequently to a powdered material that would pass through a 20-mesh sieve (U.S. Sieve Series) and would be retained on a 40-mesh sieve (U.S. Sieve Series). The calcined powdered material was impregnated with a solution of $H_2PtCl_6$ as described in Example II. The catalyst support of alumina and Zeolon-H that had a silica-to-alumina ratio of 10:1 was prepared to contain 2.0 weight percent Zeolon-H. The catalyst, Catalyst C, was prepared to contain 0.8 weight percent platinum and 0.8 weight percent chlorine.

EXAMPLE IV

A catalyst containing Zeolon-H that possessed a silica-to-alumina ratio of 27:1 was prepared. This catalyst will be identified hereinafter as Catalyst D. A 6.6-gm. portion of Zeolon-H cake, containing 76.0 weight percent solids and obtained from the Norton Company as sample number 0670K, was blended with 200 ml. of distilled water. The Zeolon-H-water blend was then added to 2,720 gms. of PHF-type alumina sol (8.9 weight percent alumina) manufactured by the American Cyanamid Company. After thorough blending, 100 ml. of a 10% ammonium hydroxide solution were added to produce a gel. The gel was dried in air overnight at a temperature of 250° F. and was calcined subsequently in air for 2 hours at a temperature of 900° F. The calcined material was then blended with sufficient Sterotex to provide 4% Sterotex and was pelleted into ⅛ inch X ⅛ inch pellets. The pellets were calcined in air for 3 hours at a temperature of 1,000° F. and were ground into a powder that would pass through a 20-mesh sieve (U.S. Sieve Series), but would be retained on a 40-mesh sieve (U.S. Sieve Series). The calcined powdered material was impregnated with a solution of $H_2PtCl_6$ as described in Example II. The catalyst support of alumina and Zeolon-H that had a silica-to-alumina ratio of 27:1 was prepared to contain 2.0 weight percent Zeolon-H that had a silica-to-alumina ratio of 27:1. The catalyst, Catalyst D, was prepared to contain 0.8 weight percent platinum and 0.8 weight percent chlorine.

EXAMPLE V

A catalyst containing Zeolon-H that possessed a silica-to-alumina ratio of 44:1 was prepared. This catalyst will be identified hereinafter as Catalyst E. A 5.2-gm. portion of Zeolon-H powder, containing 96.6 weight percent solids and obtained from the Norton Company as sample number 0675K, was blended with 200 ml. of distilled water. The Zeolon-H-water blend was added to 2,720 gms. of PHF-type alumina sol (8.9 weight percent alumina) manufactured by the American Cyanamid Company. After thorough blending, 100 ml. of a 10% ammonium hydroxide solution were added to produce a gel. The gel was dried in air overnight at a temperature of 250° F. and was calcined in air for 2 hours at a temperature of 900° F. The calcined material was blended with sufficient Sterotex to provide 4% Sterotex and was pelleted into ⅛ inch × ⅛ inch pellets. The pellets were calcined in air for 3 hours at a temperature of 1,000° F. and were ground subsequently to a powder that would pass through a 20-mesh sieve (U.S. Sieve Series), but would be retained on a 40-mesh sieve (U.S. Sieve Series). The calcined powdered material was impregnated with a solution of $H_2PtCl_6$ as described in Example II. The catalyst support of alumina and Zeolon-H that had a silica-to-alumina ratio of 44:1 was prepared to contain 2.0 weight percent Zeolon-H. The catalyst, Catalyst E, was prepared to contain 0.8 weight percent platinum and 0.8 weight percent chlorine.

EXAMPLE VI

Catalysts A, B, C, D, and E were subjected to reforming activity tests under standardized test conditions, each test employing about 20 gms. of catalyst in a quasi-isothermal reaction zone immersed in a molten salt bath for temperature control. The hydrocarbon feedstock that was employed for these tests was a stabilized reformate produced by mildly reforming a Mid Continent naphtha to convert a major portion of the naphthenes therein into aromatics. The properties of this feedstock are presented in Table I.

Table 1

| Feedstock Properties | |
|---|---|
| Unleaded Research Octane No., CFR-R | 83.3 |
| Gravity, ° API | 52.5 |
| ASTM Distillation, ° F. | |
| IBP | 108 |
| 10% | 182 |
| 30% | 230 |
| 50% | 255 |
| 70% | 277 |
| 90% | 310 |
| EP | 360 |
| Hydrocarbon Type, vol. % | |
| Aromatics | 45.0 |
| Naphthenes | 4.5 |
| Olefins | — |

Table 1-continued

| | Feedstock Properties |
|---|---|
| Paraffins | 50.5 |

The reforming activity tests were carried out under the following conditions: the bath temperature in each case was set at 900° F.; the pressure was 300 psig; the WHSV was maintained at 2.31 gms. of hydrocarbon per hour per gram of catalyst; and the once-through hydrogen rate was held at about 5,000 SCFB. The results of these tests are presented in Table II.

Table II

| Catalyst | Zeolon-H. wt.% | Test Results Zeolon-H $SiO_2$-to-$Al_2O_3$ Ratio | Hours on Oil | Research Octane No. CFR-R |
|---|---|---|---|---|
| A | 0 | 0 | 21 | 97.3 |
|   |   |   | 45 | 96.0 |
| B | 0 | 0 | 21 | 97.0 |
|   |   |   | 45 | 95.8 |
| C | 2 | 10:1 | 21 | 99.8 |
|   |   |   | 45 | 99.1 |
|   |   |   | 21 | 101.3 |
|   |   |   | 45 | 100.3 |
|   |   |   | 69 | 100.2 |
| D | 2 | 27:1 | 21 | 105.6 |
|   |   |   | 45 | 104.3 |
|   |   |   | 21 | 106.1 |
|   |   |   | 45 | 104.4 |
|   |   |   | 69 | 104.5 |
|   |   |   | 93 | 104.1 |
| E | 2 | 44:1 | 21 | 104.2 |
|   |   |   | 21 | 102.6 |
|   |   |   | 45 | 103.5 |

The reforming tests employing Catalyst D and the reforming tests employing Catalyst E are specific embodiments of a process of the present invention. Catalysts D and E are specific embodiments of the catalytic composition of the present invention.

The octane number provides an indication of the activity of the catalyst. Two tests were made with each of Catalysts C, D, and E. The test results presented in Table II are also plotted in FIG. 2. This figure demonstrates that an unleaded research octane number of at least 103.5 can be obtained when a reforming catalyst containing 2 weight percent Zeolon-H is tested under the above-described conditions, if the Zeolon-H has a silica-to-alumina ratio that is at least 19:1, but is less than 45:1.

The results obtained from the above tests indicate that there is provided according to the present invention an improved reforming process employing an improved reforming catalyst. The results show that a catalytic composition containing a mordenite-structure aluminosilicate material having a silica-to-alumina ratio of at least 19:1 and less than 45:1 is a superior reforming catalytic composition.

What is claimed is:
1. An improved catalytic composition for the reforming of petroleum hydrocarbon streams, which catalytic composition consists of a Group VIII noble metal, mordenite, and an alumina, said mordenite having a silica-to-alumina ratio that is at least 19:1 but less than 45:1.
2. The catalytic composition of claim 1 wherein said Group VIII noble metal is platinum.
3. The catalytic composition of claim 1 wherein said alumina is selected from the group consisting of gamma-alumina, eta-alumina, and mixtures thereof.

4. The catalytic composition of claim 2 wherein said alumina is selected from the group consisting of gamma-alumina, eta-alumina, and mixtures thereof.

5. An improved catalytic composition for the reforming of petroleum hydrocarbon streams, which catalytic composition consists of a Group VIII noble metal, mordenite, a combined halogen, and an alumina, said mordenite having a silica-to-alumina ratio that is at least 19:1 but less than 45:1.

6. The catalytic composition of claim 5 wherein said combined halogen is combined chlorine.

7. The catalytic composition of claim 6 wherein said Group VIII noble metal is platinum.

8. The catalytic composition of claim 6 wherein said alumina is selected from the group consisting of gamma-alumina, eta-alumina, and mixtures thereof.

9. The catalytic composition of claim 7 wherein said alumina is selected from the group consisting of gamma-alumina, eta-alumina, and mixtures thereof.

* * * * *

UNITED STATES PATENT OFFICE
CERTIFICATE OF CORRECTION

Patent No. 4,018,711                      Dated April 19, 1977

Inventor(s) Ralph J. Bertolacini

It is certified that error appears in the above-identified patent and that said Letters Patent are hereby corrected as shown below:

Column 1, line 21,   "Group-VII-metal-containing" should be -- Group-VIII-metal-containing --.

Column 1, line 66,   "Group VII" should be -- Group VIII --.

Column 4, line 9,   "chains" should be -- channels --.

Column 6, line 52,   "of 850°F." should be -- of about 850°F. --.

Column 7, line 55,   "=" should be -- X --.

Signed and Sealed this

Second Day of October 1979

[SEAL]

Attest:

RUTH C. MASON
Attesting Officer

LUTRELLE F. PARKER
Acting Commissioner of Patents and Trademarks